US00RE45205E

(19) United States
(12) Reissued Patent
Arisawa et al.

(10) Patent Number: US RE45,205 E
(45) Date of Reissued Patent: Oct. 28, 2014

(54) IC CHIP AND INFORMATION PROCESSING TERMINAL

(75) Inventors: Shigeru Arisawa, Tokyo (JP); Akihiko Yamagata, Tokyo (JP)

(73) Assignee: Sony Corporation, Tokyo (JP)

(21) Appl. No.: 12/458,386

(22) Filed: Jul. 9, 2009

Related U.S. Patent Documents

Reissue of:
(64) Patent No.: 7,240,846
Issued: Jul. 10, 2007
Appl. No.: 10/433,785
PCT Filed: Oct. 10, 2002
PCT No.: PCT/JP02/10542
§ 371 (c)(1),
(2), (4) Date: Jun. 6, 2003
PCT Pub. No.: WO03/038743
PCT Pub. Date: May 8, 2003

(30) Foreign Application Priority Data

Oct. 31, 2001 (JP) ..... 2001-334965

(51) Int. Cl.
*G06K 19/06* (2006.01)

(52) U.S. Cl.
USPC ..... 235/492; 235/375; 235/384

(58) Field of Classification Search
USPC ..... 235/492, 375, 384, 493, 441, 436, 380
See application file for complete search history.

(56) References Cited

U.S. PATENT DOCUMENTS

| | | | | |
|---|---|---|---|---|
| 5,541,985 | A | 7/1996 | Ishii et al. | |
| 5,623,224 | A | 4/1997 | Yamada et al. | |
| 5,748,737 | A * | 5/1998 | Daggar | 705/41 |
| 5,811,771 | A * | 9/1998 | Dethloff | 235/380 |
| 5,929,414 | A * | 7/1999 | Saitoh | 235/380 |
| 6,003,777 | A * | 12/1999 | Kowalski | 235/492 |
| 6,045,043 | A * | 4/2000 | Bashan et al. | 235/441 |
| 6,068,193 | A * | 5/2000 | Kreft | 235/492 |
| 6,126,077 | A * | 10/2000 | Tanaka et al. | 235/492 |
| 6,138,918 | A * | 10/2000 | Tarbouriech | 235/492 |
| 6,168,083 | B1 | 1/2001 | Berger et al. | |
| 6,257,486 | B1 * | 7/2001 | Teicher et al. | 235/380 |
| 6,375,082 | B1 * | 4/2002 | Kobayashi et al. | 235/492 |
| 6,577,229 | B1 * | 6/2003 | Bonneau et al. | 340/10.41 |
| 6,776,339 | B2 * | 8/2004 | Piikivi | 235/451 |

FOREIGN PATENT DOCUMENTS

| | | |
|---|---|---|
| EP | 0 534 559 A1 | 3/1993 |
| EP | O 838 780 | 11/1997 |
| EP | 1 117 068 A1 | 7/2001 |
| EP | 1 376 460 A1 | 1/2004 |

(Continued)

OTHER PUBLICATIONS

International Search Report and Examination Report Feb. 12, 2003.
European Patent Office Communication of Notices of Opposition (R79(1) EPC) issued Oct. 10, 2012 for corresponding European Reissue Application No. 02775323.5-2210; EP Patent No. 1 441 306 B1.

(Continued)

*Primary Examiner* — Ahshik Kim
(74) *Attorney, Agent, or Firm* — Rader, Fishman & Grauer PLLC

(57) ABSTRACT

When an IC card is passed over an external card reading and writing apparatus, the IC card starts communication with the card reading and writing apparatus via a wireless interface, so that a change in the internal state of the IC card is reported to an external device via an external wired interface or a dedicated control signal line, thus allowing a specific application to be enabled on the external device or allowing a controller to be powered on and activated. Alternatively, the controller is powered off and deactivated. Accordingly, processing according to the communication state between the IC card and the card reading and writing apparatus or the internal state of the IC card can be smoothly initiated.

21 Claims, 10 Drawing Sheets

(56) References Cited

FOREIGN PATENT DOCUMENTS

| | | | |
|---|---|---|---|
| JP | 6-162279 | A1 | 6/1994 |
| JP | 10-164077 | A1 | 6/1998 |
| JP | 10-191454 | A1 | 7/1998 |
| JP | 2001-250094 | A1 | 9/2001 |
| JP | 2001-273528 | A1 | 10/2001 |
| WO | WO-98/33343 | A1 | 7/1998 |
| WO | WO-99/34326 | A1 | 7/1999 |
| WO | WO-01/80193 | A1 | 10/2001 |

OTHER PUBLICATIONS

Finkenzeller, RFID Handbook; Fundamentals and Applications in Contactless Smart Cards and Identification, Second Edition, 2003, ISBN: 9-470-84402-7.

European Patent Office Summons to Attend Oral Proceeding Pursuant to Rule 115(1) EPC issued Mar. 24, 2014 in corresponding European Application No. 02775323.5—1806 / 1441306.

* cited by examiner

IC CHIP AND INFORMATION PROCESSING TERMINAL

Matter enclosed in heavy brackets [ ] appears in the original patent but forms no part of this reissue specification; matter printed in italics indicates the additions made by reissue.

This application *is a reissue application of application Ser. No. 10/433,785, now U.S. Pat. No. 7,240,846, issued Jul. 10, 2007, which* is a 371 of PCT/JP02/10542 filed on Oct. 10, 2002. *The present invention contains subject matter related to Japanese Patent Application JP 2001-334965 filed in the Japanese Patent Office on Oct. 31, 2001.*

1. Technical Field

The present invention relates to a non-contact IC card or IC chip which has a memory function for storing data and which is configured such that data can be read from and written to the memory in a non-contact manner. More particularly, the present invention relates to a non-contact IC card or IC chip including a wireless interface for wireless data access to the memory function from an external reader/writer and a wired interface for connection with an external device, and relates to an information processing terminal such as a cellular telephone, a PDA, or a personal computer connected to such an IC card via a wired interface or incorporating such an IC chip when used.

2. Background Art

Hitherto, a variety of apparatuses using a secret personal number or a password for personal identity verification or authentication has been devised and put into practice. In banks or other financial institutions, for example, for using cash cards or credit cards, cash dispensers or other banking terminals prompt users to enter a secret personal number or a password for personal identity authentication, and cash cannot be deposited or withdrawn until it has been confirmed that the correct secret personal number or password was entered by the user.

A storage medium such as a magnetic stripe placed on one cash card has only a single storage area for only the corresponding bank. The above-noted secret personal number or password entry merely allows access to the single storage area, and may be insufficient for protection against forgery or theft.

For anti-forgery purposes, the cash card or credit card is often implemented as a contact IC card having an electric contact or a non-contact IC card for reading and writing data in a non-contact manner via wireless data communication. IC card readers/writers installed in, for example, cash dispensers, at the entrances of concert halls, on station ticket gates, and so on are able to access IC cards passed thereover by users in a non-contact manner.

A user enters a secret personal number to the reader of an IC card reader/writer to verify the entered secret personal number against a secret personal number stored in the IC card, thus realizing personal identity verification or authentication between the IC card and the IC card reader/writer. When personal identity verification or authentication is successfully performed, for example, an application stored in the IC card can be used. The applications stored in an IC card may include, for example, that for amount information such as electronic money and electronic ticketing. (A secret personal number for use in accessing an IC card is referred to as PIN (Personal Identification Number).)

Recently, with the development of nanotechnology, IC cards having a relatively large capacity of storage space have become commercially available and have become increasingly widespread. Since a traditional cash card has only a single storage area, i.e., a single application, carried therein, it is necessary to carry a plurality of cards for various uses or applications. On the other hand, the above-noted IC card having a large capacity memory can concurrently store a plurality of applications, and, therefore, a single IC card can be used for a plurality of applications. For example, more than one application used for electronic money for electronic payment, electronic tickets for admission to designated concert halls, and so on can be stored on a single IC card so as to use the single IC card in various applications.

An IC card includes not only a non-contact interface with a card reader/writer (card reading and writing apparatus) but also a wired interface for connecting to an external device, and the IC card can be connected to or installed in an information processing terminal such as a cellular telephone, a PDA (Personal Digital Assistant), or a personal computer when used. (In many cases where the IC card is installed in the terminal, the IC card is formed into one chip. The IC card and IC chip are hereinafter collectively referred to simply as an "IC card".)

In such a case, a variety of application services using the IC card can be performed on the information processing terminal. For example, a user interface such as a keyboard or a display on the information processing terminal can be used for user interaction with the IC card on the information processing terminal. If the IC card is connected to a cellular telephone, the content stored in the IC card can be exchanged over a telephone line.

It is to be understood that, in the case where amount information such as electronic money and electronic tickets is stored in the IC card, the information processing terminal can realize amount information processing such as electronic payment and other various services. The information processing terminal can also provide processing according to a data transfer phase between the IC card and a card reading and writing apparatus, or processing according to the internal state of the IC card.

DISCLOSURE OF INVENTION

Generally, non-contact IC cards can be driven by power extracted from wireless communication with a card reading and writing apparatus. Therefore, once the IC card is passed over the card reading and writing apparatus, it can be activated.

On the other hand, an information processing terminal which is driven by a battery (or a commercial power supply) must be powered on beforehand and must further start an application to perform desired processing.

An information processing terminal connected to or incorporating an IC card does not include a mechanism for determining the communication state between the IC card and a card reading and writing apparatus. Thus, the information processing terminal integrated with the IC card cannot execute applications for the IC card only by passing the IC card over the card reading and writing apparatus, and a predetermined application must be started on the information processing terminal beforehand for preparation. An application is started on the information processing terminal by a manual user operation, which is bothersome when the IC card is used.

The present invention has been made in view of the aforementioned technical problems, and, primarily, it is an object of the present invention to provide a better non-contact IC card or IC chip including a wireless interface for wireless data access to a memory function from an external reader/writer and a wired interface for connection with an external device, and to provide a better information processing terminal connected to such an IC card via a wired interface or incorporating such an IC chip when used.

It is another object of the present invention to provide an IC card including both a wireless interface and a wired interface, in which processing related to the IC card can be smoothly initiated without heavy burden on the user, and to provide an information processing terminal connected to such an IC card via a wired interface or having the IC card installed therein.

It is another object of the present invention to provide an IC card having both a wireless interface and a wired interface, in which processing according to the communication state between the IC card and a card reading and writing apparatus or the internal state of the IC card can be smoothly initiated, and to provide an information processing terminal connected to such an IC card via a wired interface or having the IC card installed therein.

The present invention has been made in order to overcome the aforementioned problems, and, in a first aspect of the present invention, an IC chip includes a memory for storing predetermined information; a control unit for controlling access to the memory; a wireless communication unit for performing wireless communication with a reading and writing apparatus which accesses the memory; and an external interface for connecting to an information processing terminal external to the chip, wherein an internal state, which changes according to the wireless communication with the reading and writing apparatus via the wireless communication unit, is reported to the information processing terminal connected to the external interface. The wireless communication unit can vary the load across an antenna thereof according to a response signal to a query signal from the reading and writing apparatus, so that a signal that appears in a receiving circuit of the reading and writing apparatus is amplitude-modulated for non-contact data communication.

The IC chip according to the first aspect of the present invention may cause the internal state, which changes according to the wireless communication with the reading and writing apparatus via the wireless communication unit, to be reported to the information processing terminal via the external interface. Alternatively, the internal state may be reported to the information processing terminal via a dedicated communication path other than the external interface.

In a second aspect of the present invention, an IC chip includes a memory for storing predetermined information; a control unit for controlling access to the memory; a wireless communication unit for performing wireless communication with a reading and writing apparatus which accesses the memory; an external interface for connecting to an information processing terminal external to the chip; and a carrier wave detection unit for detecting a carrier wave from the reading and writing apparatus, wherein a report indicating whether or not the carrier wave has been detected, which is obtained from the carrier wave detection unit, is sent to the information processing terminal connected to the external interface. The wireless communication unit can vary the load across an antenna thereof according to a response signal to a query signal from the reading and writing apparatus, so that a signal that appears in a receiving circuit of the reading and writing apparatus is amplitude-modulated for non-contact data communication.

The IC chip according to the second aspect of the present invention may cause the report indicating whether or not the carrier wave has been detected from the reading and writing apparatus to be sent to the information processing terminal via the external interface. Alternatively, the report indicating whether or not the carrier wave has been detected may be sent to the information processing terminal via a dedicated communication path other than the external interface.

Generally, once an IC chip or IC card is passed over a reading and writing apparatus, a carrier wave is received from the reading and writing apparatus, thereby starting communication with the reading and writing apparatus via a wireless communication unit. According to the IC chip of the first or second aspect of the present invention, a change in the internal state of the IC chip or the presence or absence of carrier waves from the card reading and writing apparatus can be reported to the information processing terminal using the external interface or a dedicated control signal line. The information processing terminal does not rely on a user operation to automatically enable a specific application for processing the IC card or to power on a controller to activate it. When no carrier wave is detected, the controller may be powered off or deactivated, thus achieving power saving.

In a third aspect of the present invention, an information processing terminal which is equipped with an IC chip for performing wireless communication with a reading and writing apparatus includes:

an external interface to which the IC chip is connected; and a control unit for controlling the overall operation of the terminal, wherein an internal state, which changes according to the wireless communication with the reading and writing apparatus, is reported from the IC chip.

The IC chip incorporated in the information processing terminal varies the load across an antenna thereof according to a response signal to a query signal from the reading and writing apparatus, so that a signal that appears in a receiving circuit of the reading and writing apparatus is amplitude-modulated for communication.

The information processing terminal according to the third aspect of the present invention may cause the internal state of the IC chip, which changes according to the wireless communication with the reading and writing apparatus, to be reported to the information processing terminal via the external interface. Alternatively, the internal state may be reported to the information processing terminal via a dedicated communication path other than the external interface.

The control unit may start processing according to the reported internal state of the IC chip. Since an application is automatically enabled or disabled on the information processing terminal according to the internal state of IC chip, the user need not perform a time-consuming operation to enable the application each time the IC chip is used.

The information processing terminal according to the third aspect of the present invention may further include a power supply control unit for controlling power supply to the control unit to be turned on and/or off. The power supply control unit switches power supply to the control unit to be turned on and/or off according to the reported internal state of the IC chip. Therefore, according to the internal state of the IC chip, power is not fed to the control unit unless necessary, and power supply to the control unit is automatically turned on if necessary, thus achieving power saving.

In a fourth aspect of the present invention, an information processing terminal which is equipped with an IC chip for performing wireless communication with a reading and writing apparatus includes:

an external interface to which the IC chip is connected; and a control unit for controlling the overall operation of the terminal, wherein a report indicating whether or not a carrier wave from the reading and writing apparatus has been detected is received from the IC chip.

The IC chip incorporated in the information processing terminal varies the load across an antenna thereof according to a response signal to a query signal from the reading and writing apparatus, so that a signal that appears in a receiving circuit of the reading and writing apparatus is amplitude-modulated for communication.

The information processing terminal according to the fourth aspect of The present invention may cause a report indicating whether or not the carrier wave has been detected from the reading and writing apparatus to be sent to the information processing terminal via the external interface. Alternatively, a report indicating whether or not the carrier wave has been detected from the reading and writing apparatus may be sent to the information processing terminal via a dedicated communication path other than the external interface.

The control unit may start predetermined processing when the IC chip detects a carrier wave from the reading and writing apparatus. Since an application is automatically enabled or disabled on the information processing terminal according to the communication state of the IC chip, the user need not perform a time-consuming operation to enable the application each time the IC chip is used.

The information processing terminal according to the fourth aspect of the present invention may further include a power supply control unit for controlling power supply to the control unit to be turned on and/or off. The power supply control unit switches power supply to the control unit to be turned on and/or off according to whether or not the IC chip has detected a carrier wave from the reading and writing apparatus. Therefore, according to the internal state of the IC chip, power is not fed to the control unit unless necessary, and power supply to the control unit is automatically turned on if necessary, thus achieving power saving.

Other objects, features, and advantages of the present invention will become apparent from the following more detailed description taken in conjunction with embodiments of the present invention or with reference to the accompanying drawings.

BEST MODE FOR CARRYING OUT THE INVENTION

Embodiments of the present invention are described in detail below with reference to the drawings.

Figure 1:
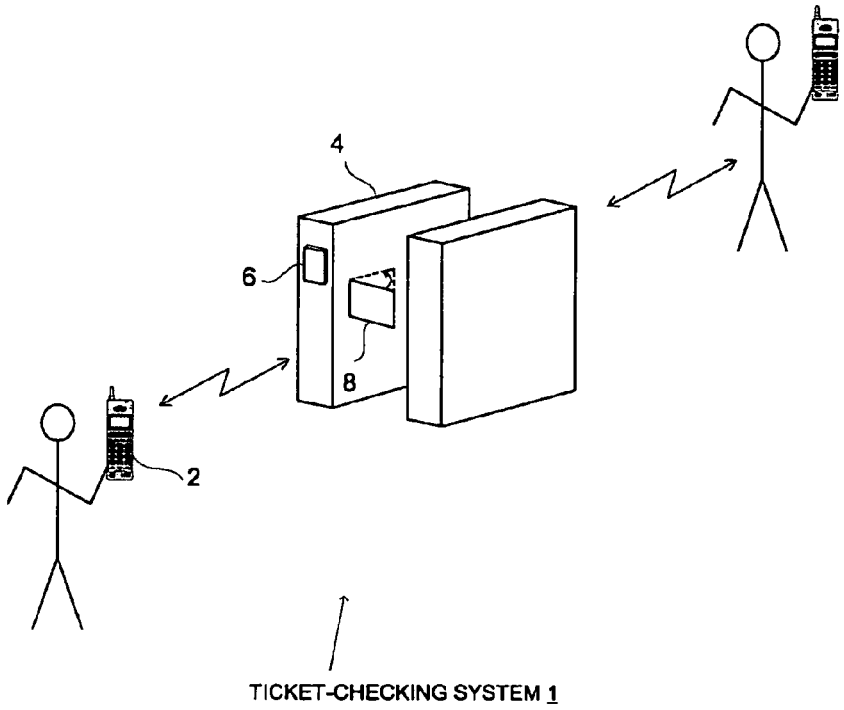
FIG. 1 is a schematic diagram showing the structure of a ticket-checking system 1 which employs a portable terminal 2 according to an embodiment of the present invention.

FIG. 1 schematically shows the structure of a ticket-checking system 1 which employs a portable terminal 2 according to an embodiment of the present invention. The portable terminal 2 is, for example, a cellular telephone with a non-contact IC card function, and is carried by a user during transportation. A ticket checker 4 is installed in a station ticket gate or the like, and uses the opening and closing operation of a walk-through door 8 to control users walking therethrough based on the billing state or other conditions. A card reading and writing apparatus 6 is installed on the ticket checker 4 to access an IC card from the portable terminal 2 of a user walking through the ticket gate to read and write data.

When the user carrying the portable terminal 2 is close to the ticket checker 4, the card reading and writing apparatus 6 installed on the ticket checker 4 senses the portable terminal 2 approaching it and performs communication with the portable terminal 2. When the user is allowed to walk therethrough after billing and authentication checks, the walk-through door 8 opens, thus allowing the user to walk through the ticket gate.

Figure 2:
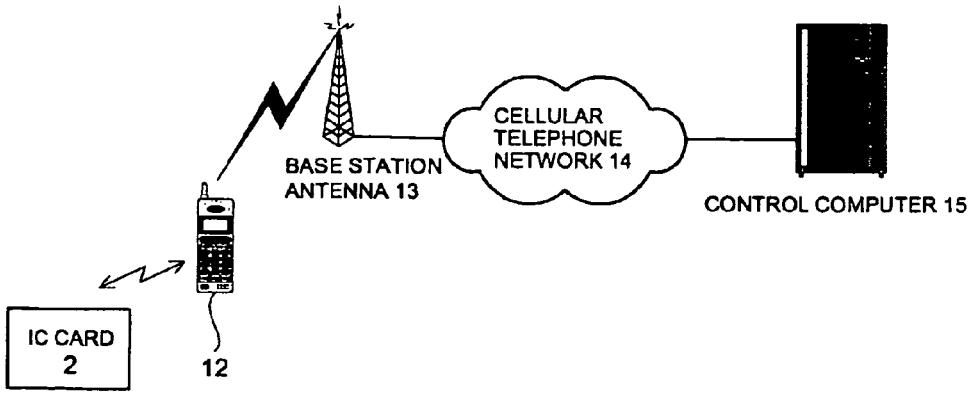
FIG. 2 is a schematic diagram showing the structure of a payment system realized by using a portable terminal 2 having an IC card function and a card reading and writing function.

The portable terminal 2 according to this embodiment may have not only the IC card function but also a card reading and writing function for accessing an external IC. FIG. 2 schematically shows the configuration of a payment system realized by using the portable terminal 2 having an IC card function and a card reading and writing function.

In the payment system shown in FIG. 2, an information terminal 12, such as a cellular telephone, can perform non-contact communication with a non-contact IC card 2 external to the terminal, and can be connected to a host terminal on a network via a cellular telephone network 14. As an example, when a small transportation charge (transportation points) balance or other amount information remains on the non-contact IC card 2, the portable terminal 12 reads the amount information recorded on the IC card 2. If the amount is insufficient, the portable terminal 12 accesses a control computer 15 via a base station antenna 13 over the cellular telephone network 14 to acquire new points therefrom and writes the points to the non-contact IC card.

The manner by which an information processing terminal such as a cellular telephone is equipped with an IC card is not uniquely defined. For example, an IC chip formed into one chip and a wireless antenna may be installed in an information processing terminal, or a IC chip formed into a card, i.e., an IC card, may be connected to a card slot or any other wired interface of a portable terminal. In the following description, the IC chip and IC card are collectively referred to as an IC card. The IC card has a function relating to amount information, such as prepaid electronic money or electronic ticketing.

Figure 3:
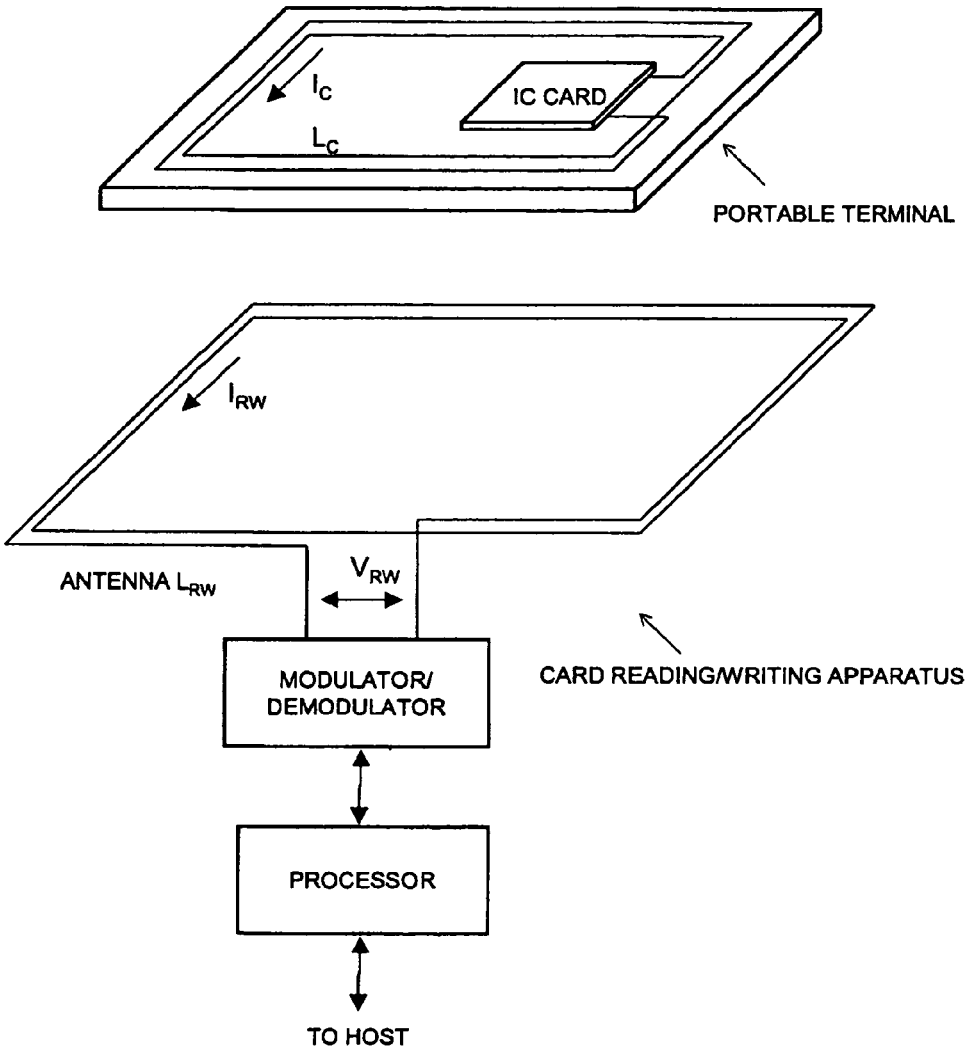
FIG. 3 is a diagram showing the concept of wireless communication based on electromagnetic induction between the card reading and writing apparatus and the IC card.

Wireless communication between a card reading and writing apparatus and an IC card is realized based on, for example, the principle of electromagnetic induction. FIG. 3 illustrates the concept of wireless communication based on electromagnetic induction between the card reading and writing apparatus and the IC card.

The card reading and writing apparatus includes an antenna $L_{RW}$ formed of a loop coil for generating a magnetic field therearound by causing a current $I_{RW}$ to flow in the antenna $L_{RW}$. The IC card has a loop coil $L_C$ electrically formed around the IC card. An induced voltage caused by the magnetic field generated by the loop antenna $L_C$ of the card reading and writing apparatus is generated at ends of the loop coil $L_C$ of the IC card, and is input to terminals of the IC card that are connected to the ends of the loop coil $L_C$.

Although the degree of coupling of the antenna $L_{RW}$ of the card reading and writing apparatus and the loop coil $L_C$ of the IC card varies depending upon the positional relationship therebetween, the combination of the antenna $L_{RW}$ and the loop coil $L_C$ can be considered as a single transformer. The reading and writing operation for the IC card can be therefore represented as the model shown in FIG. 4.

In the card reading and writing apparatus, the current $I_{RW}$ which flows to the antenna $L_{RW}$ is modulated to modulate a voltage $V_O$ induced in the loop coil $L_C$ on the IC chip. The card reading and writing apparatus can then use this mechanism to transmit data to the IC card. The data to be transmitted includes a secret personal number or password entered by a user on an external device connected to the card reading and writing apparatus, a secret personal code for acquiring an access right to an application or a directory, and amount information, such as electronic money and electronic tickets, which is offered by an application.

The IC card has a function (load switching) for varying the load between the terminals of the loop coil $L_C$ according to data to be returned to the card reading and writing apparatus. When the load between the terminals of the loop coil $L_C$ varies, the impedance between the antenna terminals of the card reading and writing apparatus changes, thus causing a change in the flowing current $I_{RW}$ or voltage $V_{RW}$ of the antenna $L_{RW}$. The card reading and writing apparatus demodulates this change so as to receive the data returned from the IC card. The data received by an external device from the IC card includes amount information, such as electronic money and electronic tickets, which is offered by an application.

That is, the IC card varies the load across the antenna thereof according to a response signal to a query signal from the card reading and writing apparatus, so that the signal that appears in a receiving circuit of the card reading and writing apparatus is amplitude-modulated for communication.

Figure 5:
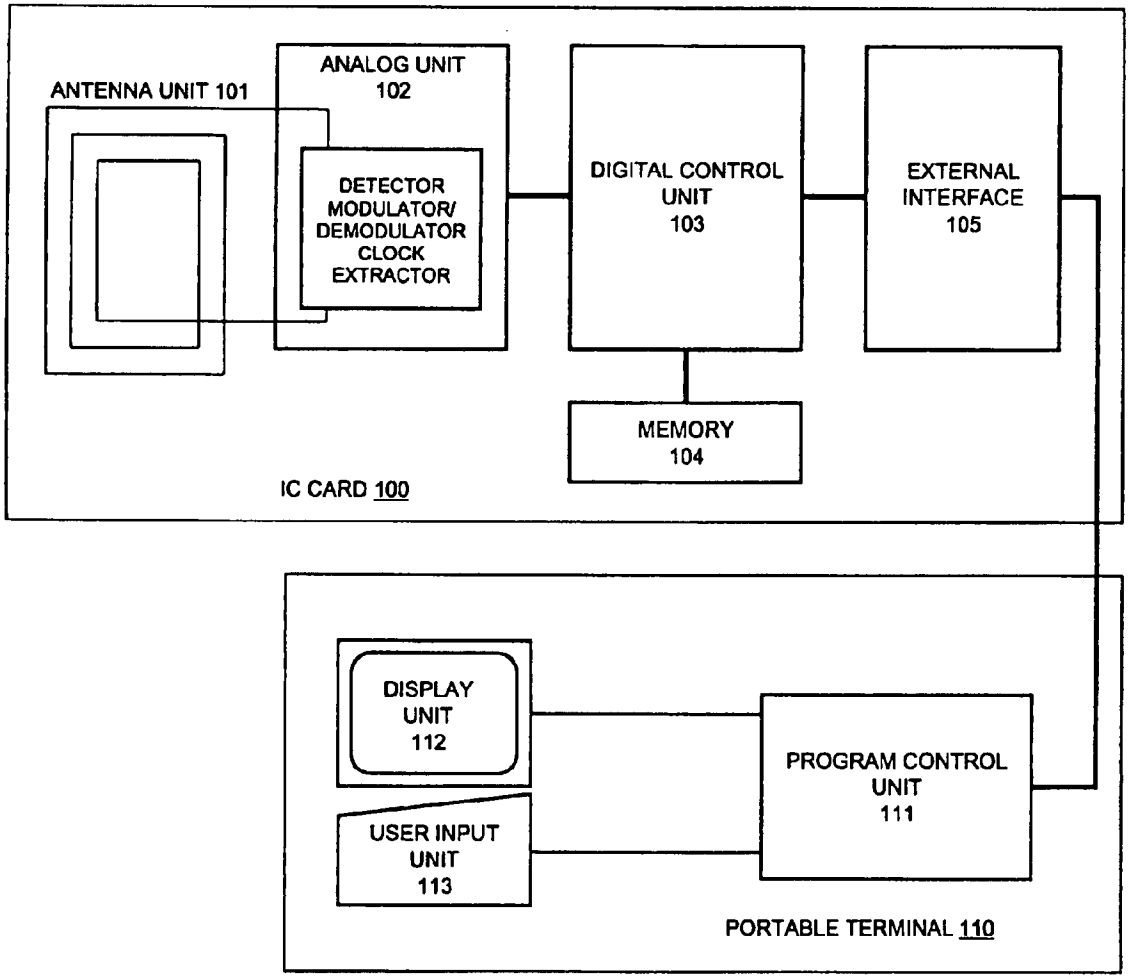
FIG. 5 is a schematic diagram of the hardware configuration of an IC card 100 according to a first embodiment of the present invention.

FIG. 5 schematically shows the hardware configuration of an IC card 100 according to a first embodiment of the present invention. As shown in FIG. 5, the IC card 100 includes an antenna unit 101, an analog unit 102, a digital control unit 103, a memory 104, and an external interface 105.

The antenna unit 101 performs non-contact data transmission and reception to and from a card reading and writing apparatus (not shown). The analog unit 102 performs processing on an analog signal which is transmitted or received from the antenna unit 101, such as detection, modulation/demodulation, and clock extraction.

The digital control unit 103 totally controls processing on received data or data to be transmitted or other operations of the IC card. The digital control unit 103 is locally connected with the addressable memory 104, which can be used to store electronic money or electronic ticketing applications, load a program code executed by the digital control unit 103, or to save the working data in progress.

The external interface 105 is a function module for connecting the digital control unit 103 to an external device, such as the portable terminal 110, according to an interface protocol different from that of a non-contact interface for connecting to the card reading and writing apparatus (not shown). The data written in the memory 104 can be transferred to the portable terminal 110 via the external interface 105.

The interface specification of the external interface 105 is not limited in particular, and either a wired interface or a wireless interface such as a Bluetooth or IEEE.802.11b interface may be used.

In this embodiment, it is assumed that the IC card 100 is installed in the portable terminal 110 when used, and the external interface 105 is implemented as a wired interface such as a UART or $I^2C$ interface (described below). However, the present invention is not limited to the above-noted interface specification.

The IC card 100 can be driven by, for example, a reception wave received from the card reading and writing apparatus via the antenna unit 101. It is to be understood that a part or all components of the IC card 100 may be driven by power supplied from the portable terminal 110.

The portable terminal 110 corresponds to, for example, an information processing terminal such as a cellular telephone, a PDA (Personal Digital Assistant), or a personal computer (PC). The portable terminal 110 includes a program control unit 111, a display unit 112, and a user input unit 113.

The program control unit 111 includes, for example, a microprocessor, a RAM (Random Access Memory), and a ROM (Read Only Memory)(these components are not shown in FIG. 5), and the microprocessor uses the RAM for a work area to execute various processing services according to a program code stored in the ROM. The processing services include the original functions of the portable terminal 110, such as a cellular telephone function, and processing for the IC card 100. It is to be understood that the program control unit 111 includes an external storage device such as a hard disk, and other peripheral devices.

The program control unit 111 can access the memory 104 of the IC card 100 via the external interface 105.

The display unit 112 is formed of, for example, a liquid crystal display (LCD), and can present the processing result of the program control unit 111 on a screen for notifying the user.

The user input unit 113 is formed of a keyboard, a jog dial, or a touch panel laid on the display screen of the display unit 112, and is used for a user to input commands or data to the portable terminal 110.

The program control unit 111 of the portable terminal 110 is driven by power fed from a main power supply (not shown), such as a battery.

When a user of the portable terminal 110 with the IC card 100 installed therein passes the portable terminal 110 over a predetermined card reading and writing apparatus, wireless communication is initiated between the IC card 100 and the card reading and writing apparatus, so that data is exchanged between the digital control unit 103 and the card reading and writing apparatus via the antenna unit 101 and the analog unit 102, which serve as a wireless interface.

Each time data is exchanged, the internal state, such as a communication phase between the digital control unit 103 and the card reading and writing apparatus, changes. In this embodiment, a specific address of the memory 104 locally connected to the digital control unit 103 is assigned to a status flag indicating the internal state.

A change in content of the status flag is sent to the program control unit 111 of the portable terminal 110 via the external interface 105.

The program control unit 111 detects the internal state of the IC card 100 based on the content of the status flag to perform processing according to the internal state. For example, the internal state is expressed on the display unit 112 by an icon indicating "communication in progress", a dialog for prompting user input is opened, an application corresponding to the internal state is enabled, telephone line connection is performed (in a case of cellular telephone), or access to a LAN or an external network such as the Internet is initiated. Furthermore, when the portable terminal 110 is connected to a telephone network or a network, data communicated between the IC card 100 and the card reading and writing apparatus can be transmitted to a host on the network, or, conversely, data downloaded from the host can be transmitted to the card reading and writing apparatus via the IC card 100.

Figure 6:
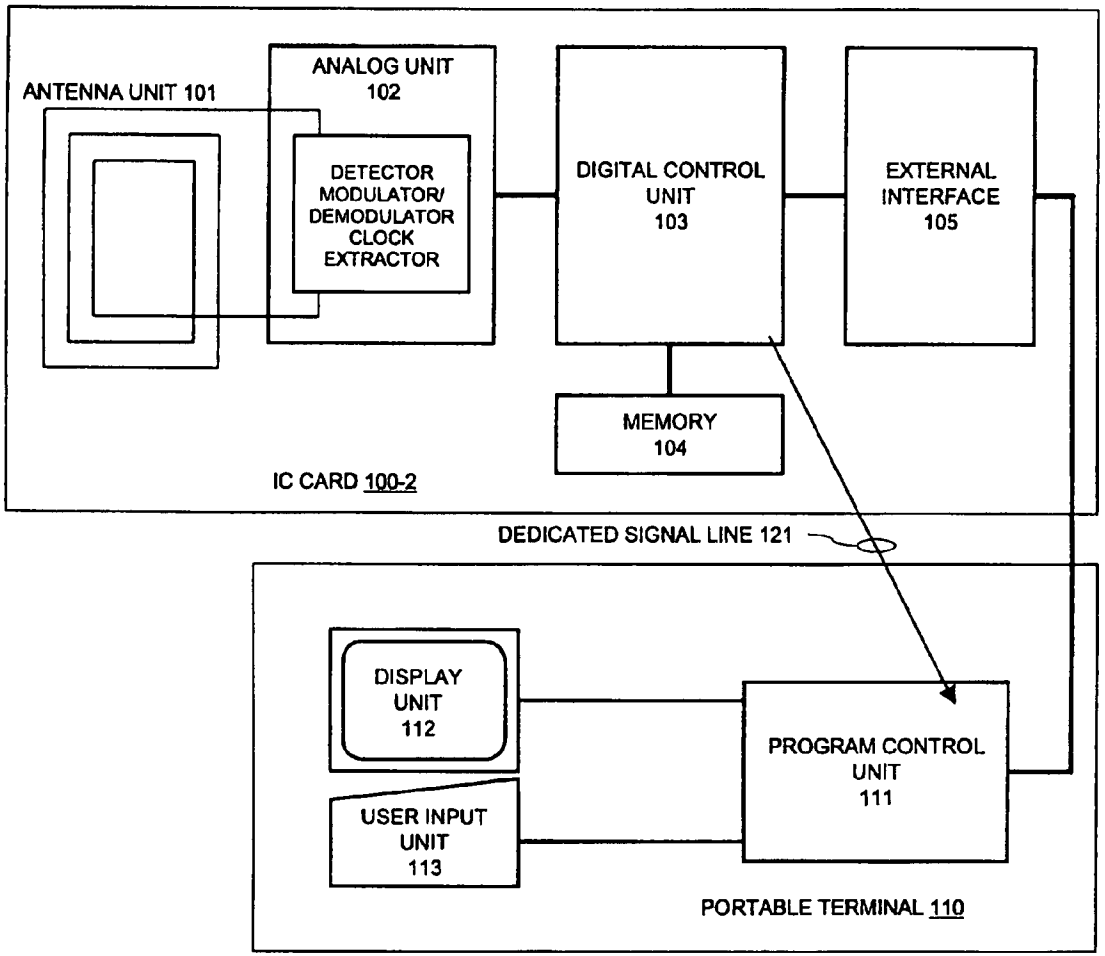
FIG. 6 is a schematic diagram of the hardware configuration of an IC card 100-2 according to a second embodiment of the present invention.

FIG. 6 schematically shows the hardware configuration of an IC card 100-2 according to a second embodiment of the present invention. As shown in FIG. 6, the IC card 100-2 includes an antenna unit 101, an analog unit 102, a digital control unit 103, a memory 104, and an external interface 105.

The antenna unit 101 performs non-contact data transmission and reception to and from a card reading and writing apparatus (not shown). The analog unit 102 performs processing on an analog signal which is transmitted or received from the antenna unit 101, such as detection, modulation/demodulation, and clock extraction.

The digital control unit 103 totally controls processing on received data or data to be transmitted or other operations of the IC card. The digital control unit 103 is locally connected with the addressable memory 104, which can be used to store electronic money or electronic ticketing applications, load a program code executed by the digital control unit 103, or to save the working data in progress.

The external interface 105 is a function module for connecting the digital control unit 103 to an external device, such as the portable terminal 110, according to an interface protocol different from that of a non-contact interface for connecting to the card reading and writing apparatus (not shown). The data written in the memory 104 can be transferred to the portable terminal 110 via the external interface 105.

In this embodiment, it is assumed that the IC card 100-2 is installed in the portable terminal 110 when used, and the external interface 105 is implemented as a wired interface such as a UART or $I^2C$ interface (described below). However, the interface specification of the external interface 105 is not limited in particular, and either a wired interface or a wireless interface such as a Bluetooth or IEEE.802.11b interface may be used.

In this embodiment, furthermore, the IC card 100-2 and the portable terminal 110 are connected with each other via the external interface 105 as well as a dedicated signal line 121. Upon detection of a change in the internal state of the IC card 100-2, the digital control unit 103 can report this detection directly to the portable terminal 110 via the dedicated signal line 121 without intermediation of the external interface 105.

The IC card 100-2 can be driven by, for example, a reception wave received from the card reading and writing apparatus via the antenna unit 101. It is to be understood that a part or all components of the IC card 100-2 may be driven by power supplied from the portable terminal 110.

The portable terminal 110 corresponds to, for example, an information processing terminal such as a cellular telephone, a PDA, or a personal computer (PC). The portable terminal 110 includes a program control unit 111, a display unit 112, and a user input unit 113.

The program control unit 111 includes, for example, a microprocessor, a RAM, and a ROM (these components are not shown in FIG. 6), and the microprocessor uses the RAM for a work area to execute various processing services according to a program code stored in the ROM. The processing services include the original functions of the portable terminal 110, such as a cellular telephone function, and processing for the IC card 100-2. It is to be understood that the program control unit 111 may include an external storage device such as a hard disk, and other peripheral devices.

The program control unit 111 can access the IC card 100-2 via the external interface 105.

In this embodiment, the program control unit 111 is connected directly to the IC card 100-2 via the dedicated signal line 121. The dedicated signal line 121 is used to report a change in the internal state of the IC card 100-2 to the program control unit 111.

The display unit 112 is formed of, for example, a liquid crystal display (LCD). For example, the display unit 112 can present the processing result of the program control unit 111 on a screen for notifying the user.

The user input unit 113 is formed of a keyboard, a jog dial, or a touch panel laid on the display screen of the display unit 112, and is used for a user to input commands or data to the portable terminal 110.

The program control unit 111 of the portable terminal 110 is driven by power fed from a main power supply (not shown), such as a battery.

When a user of the portable terminal 110 with the IC card 100-2 installed therein passes the portable terminal 110 over a predetermined card reading and writing apparatus, wireless communication is initiated between the IC card 100-2 and the card reading and writing apparatus, so that data is exchanged between the digital unit control 103 and the card reading and writing apparatus via the antenna unit 101 and the analog unit 102, which serve as a wireless interface.

Each time data is exchanged, the internal state, such as a communication phase between the digital control unit 103 and the card reading and writing apparatus, changes. In this embodiment, a specific address of the memory 104 locally connected to the digital control unit 103 is assigned to a status flag indicating the internal state.

The digital control unit 103 directly reports the change in content of the status flag to the program control unit 111 of the portable terminal 110 via the dedicated signal line 121.

The program control unit 111 executes processing corresponding to the internal state reported via the dedicated signal line 121. For example, the internal state is expressed on the display unit 112 by an icon indicating "communication in progress", a dialog for prompting user input is opened, an application corresponding to the internal state is enabled, telephone line connection is performed (in a case of cellular telephone), or access to a LAN or an external network such as the Internet is initiated. Furthermore, when the portable terminal 110 is connected to a telephone network or a network, data communicated between the IC card 100-2 and the card reading and writing apparatus can be transmitted to a host on the network, or, conversely, data downloaded from the host can be transmitted to the card reading and writing apparatus via the IC card 100-2.

Figure 7:
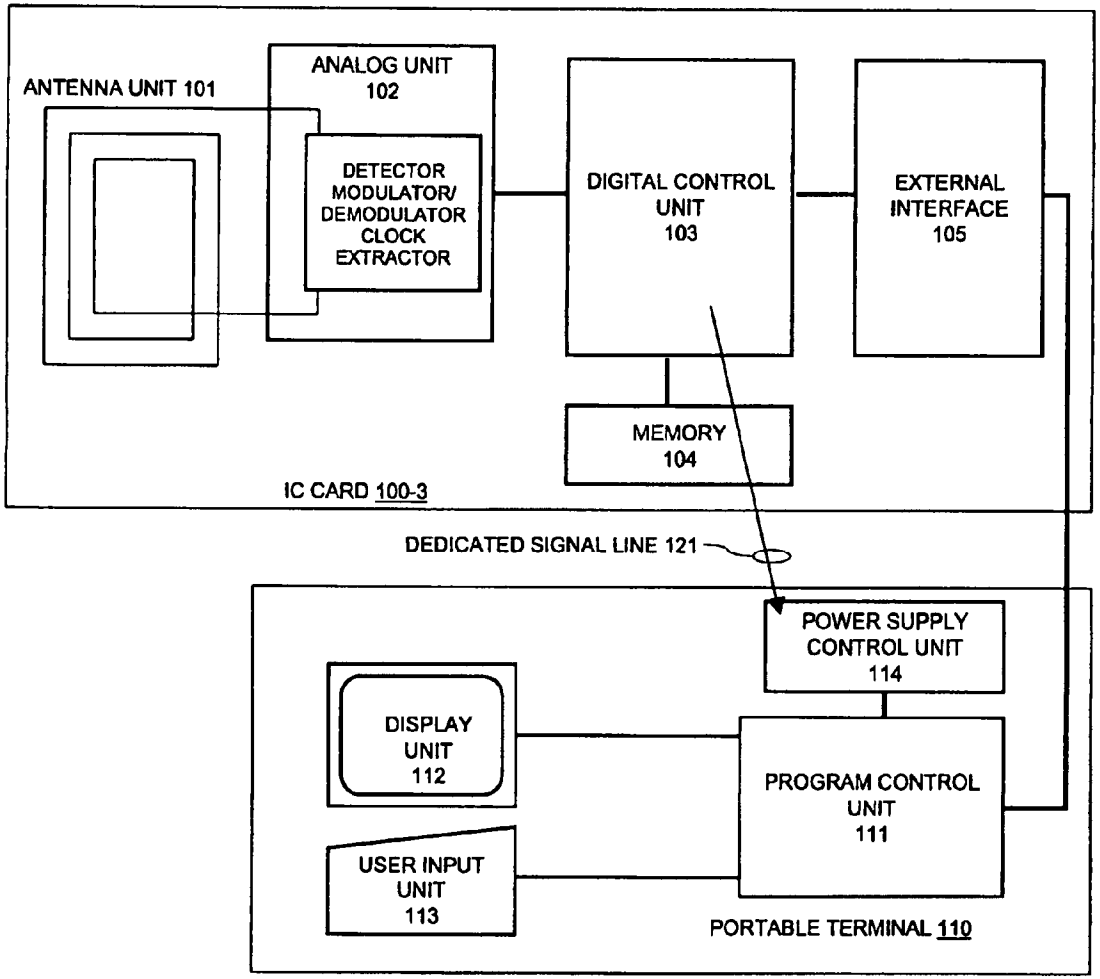
FIG. 7 is a schematic diagram of the hardware configuration of an IC card 100-3 according to a third embodiment of the present invention.

FIG. 7 schematically shows the hardware configuration of an IC card 100-3 according to a third embodiment of the present invention. As shown in FIG. 7, the IC card 100-2 includes an antenna unit 101, an analog unit 102, a digital control unit 103, a memory 104, and an external interface 105.

The antenna unit 101 performs non-contact data transmission and reception to and from a card reading and writing apparatus (not shown). The analog unit 102 performs processing on an analog signal which is transmitted or received from the antenna unit 101, such as detection, modulation/demodulation, and clock extraction.

The digital control unit 103 totally controls processing on received data or data to be transmitted or other operations of the IC card. The digital control unit 103 is locally connected with the addressable memory 104, which can be used to store electronic money or electronic ticketing applications, load a program code executed by the digital control unit 103, or to save the working data in progress.

The external interface 105 is a function module for connecting the digital control unit 103 to an external device, such as the portable terminal 110, according to an interface protocol different from that of a non-contact interface for connecting to the card reading and writing apparatus (not shown). The data written in the memory 104 can be transferred to the portable terminal 110 via the external interface 105.

In this embodiment, it is assumed that the IC card 100-3 is installed in the portable terminal 110 when used, and the external interface 105 is implemented as a wired interface such as a UART or $I^2C$ interface (described below). However, the interface specification of the external interface 105 is not limited in particular, and either a wired interface or a wireless interface such as a Bluetooth or IEEE.802.11b interface may be used.

In this embodiment, furthermore, the IC card 100-3 and the portable terminal 110 are connected with each other via the external interface 105 as well as a dedicated signal line 121. Upon detection of a change in the internal state of the IC card 100-3, the digital control unit 103 can report this detection directly to the portable terminal 110 via the dedicated signal line 121 without intermediation of the external interface 105.

The IC card 100 can 3 be driven by, for example, a reception wave received from the card reading and writing apparatus via the antenna unit 101. It is to be understood that a part or all components thereof may be driven by power supplied from the portable terminal 110.

The portable terminal 110 corresponds to, for example, an information processing terminal such as a cellular telephone, a PDA, or a personal computer (PC). The portable terminal 110 includes a program control unit 111, a display unit 112, a user input unit 113, and a power supply control unit 114.

The program control unit 111 includes, for example, a microprocessor, a RAM, and a ROM (theses components are not shown in FIG. 7), and the microprocessor uses the RAM for a work area to execute various processing services according to a program code stored in the ROM. The processing services includes the original functions of the portable terminal 110, such as a cellular telephone function, and processing for the IC card 100-3. It is to be understood that the program control unit 111 may include an external storage device such as a hard disk, and other peripheral devices.

The program control unit 111 can access the IC card 100-3 via the external interface 105.

The display unit 112 is formed of, for example, a liquid crystal display (LCD), and can present the processing result of the program control unit 111 on a screen for notifying the user.

The user input unit 113 is formed of a keyboard, a jog dial, or a touch panel laid on the display screen of the display unit 112, and is used for a user to input commands or data to the portable terminal 110.

The program control unit 111 of the portable terminal 110 is driven by power fed from a main power supply (not shown), such as a battery. The power supply control unit 114 can control power supply from the main power supply to the program control unit 111 to be turned on or off.

In this embodiment, furthermore, the power supply control unit 114 is connected directly to the IC card 100-3 via the dedicated signal line 121. A change in the internal state of the IC card 100-3 is reported to the power supply control unit 114 using the dedicated signal line 121, and the power supply control unit 114 can control power supply to the program control unit 111 to be turned on or off according to the internal state.

When a user of the portable terminal 110 with the IC card 100-3 installed therein passes the portable terminal 110 over a predetermined card reading and writing apparatus, wireless communication is initiated between the IC card 100-3 and the card reading and writing apparatus, so that data is exchanged between the digital unit 103 and the card reading and writing apparatus via the antenna unit 101 and the analog unit 102, which serve as a wireless interface.

Each time data is exchanged, the internal state, such as a communication phase between the digital control unit 103 and the card reading and writing apparatus, changes. In this embodiment, a specific address of the memory 104 locally connected to the digital control unit 103 is assigned to a status flag indicating the internal state.

The digital control unit 103 directly reports the change in content of the status flag to the power supply control unit 114 of the portable terminal 110 via the dedicated signal line 121.

The power supply control unit 114 performs processing corresponding to the reported internal state. For example, when the IC card 100-3 is connected to the card reading and writing apparatus and the program control unit 111 must start processing for data transfer, power supply to the program control unit 111 is turned on to execute it. Conversely, when the IC card 100-3 and the card reading and writing apparatus are disconnected and the program control unit 111 need not be driven for the IC card 100-3, the power supply control unit 114 shuts off power supply to the program control unit 111 to deactivate it.

Figure 8:
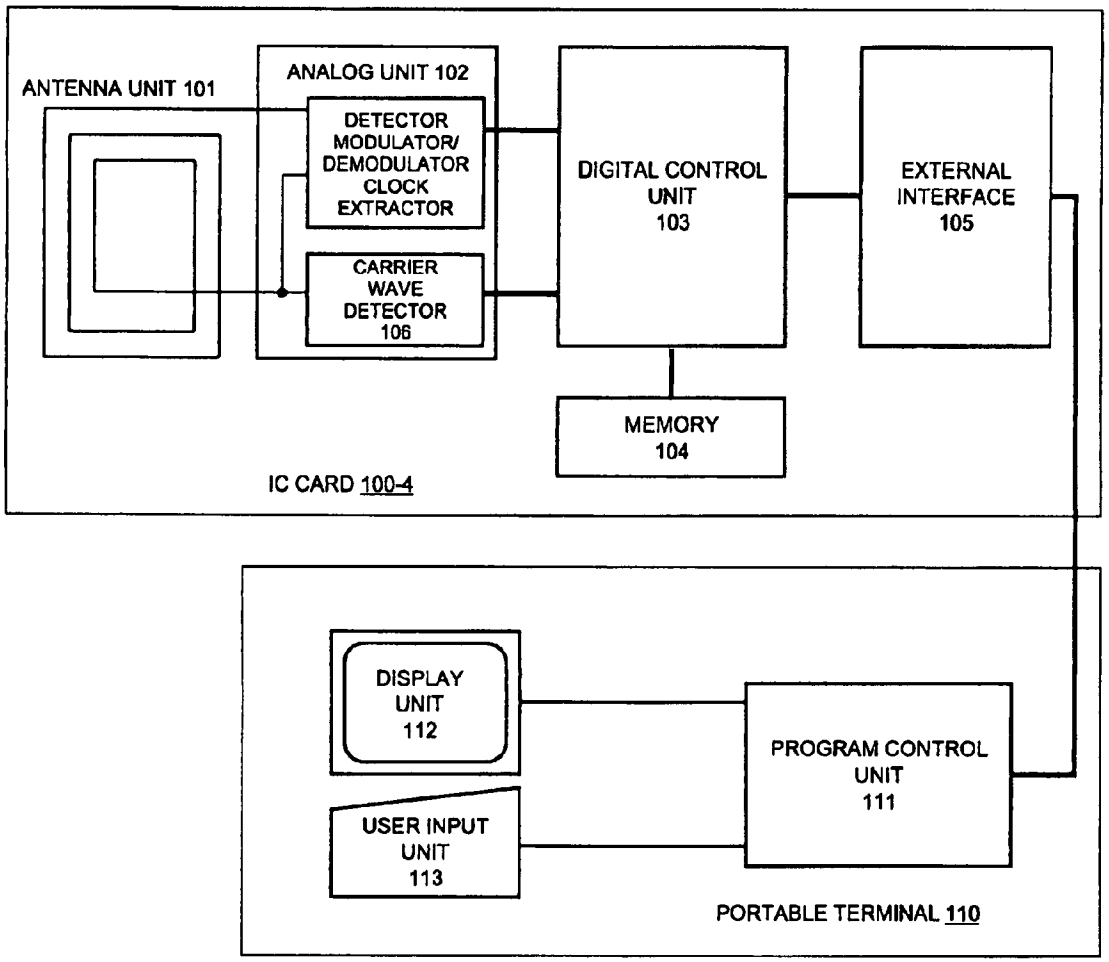
FIG. 8 is a schematic diagram of the hardware configuration of an IC card 100-4 according to a fourth embodiment of the present invention.

FIG. 8 schematically shows the hardware configuration of an IC card 100-4 according to a fourth embodiment of the present invention. As shown in FIG. 8, the IC card 100-4 includes an antenna unit 101, an analog unit 102, a digital control unit 103, a memory 104, an external interface 105, and a carrier wave detector 106.

The antenna unit 101 performs non-contact data transmission and reception to and from a card reading and writing apparatus (not shown). The analog unit 102 performs processing on an analog signal which is transmitted or received from the antenna unit 101, such as detection, modulation/demodulation, and clock extraction.

The carrier wave detector 106 detects a carrier wave from the card reading and writing apparatus to output a detection signal to the digital control unit 103.

The digital control unit 103 totally controls processing on received data or data to be transmitted or other operations of the IC card. The digital control unit 103 is locally connected with the addressable memory 104, which can be used to store electronic money or electronic ticketing applications, load a program code executed by the digital control unit 103, or to save the working data in progress.

The external interface 105 is a function module for connecting the digital control unit 103 to an external device, such as the portable terminal 110, according to an interface protocol different from that of a non-contact interface for connecting to the card reading and writing apparatus (not shown). The data written in the memory 104 can be transferred to the portable terminal 110 via the external interface 105.

In this embodiment, it is assumed that the IC card 100-4 is installed in the portable terminal 110 when used, and the external interface 105 is implemented as a wired interface such as a UART or $I^2C$ interface (described below). However, the interface specification of the external interface 105 is not limited in particular, and either a wired interface or a wireless interface such as a Bluetooth or IEEE.802.11b interface may be used.

In this embodiment, furthermore, the IC card 100-4 and the portable terminal 110 are connected with each other via the external interface 105. When a change in the communication state of the IC card 100-5 is detected by the carrier wave detector 106, the digital control unit 103 can report this detection to the portable terminal 110 via the external interface 105.

The IC card 100-4 can be driven by, for example, a reception wave received from the card reading and writing apparatus via the antenna unit 101. It is to be understood that a part or all components of the IC card 100-4 may be driven by power supplied from the portable terminal 110.

The portable terminal 110 corresponds to, for example, an information processing terminal such as a cellular telephone, a PDA, or a personal computer (PC). The portable terminal 110 includes a program control unit 111, a display unit 112, and a user input unit 113.

The program control unit 111 includes, for example, a microprocessor, a RAM, and a ROM (these components are not shown in FIG. 8), and the microprocessor uses the RAM for a work area to execute various processing services according to a program code stored in the ROM. The processing services include the original functions of the portable terminal 110, such as a cellular telephone function, and processing for the IC card 100-4. It is to be understood that the program control unit 111 may include an external storage device such as a hard disk, and other peripheral devices.

The program control unit 111 can access the IC card 100-4 via the external interface 105.

The display unit 112 is formed of, for example, a liquid crystal display, and can present the processing result of the program control unit 111 on a screen for notifying the user.

The user input unit 113 is formed of a keyboard, a jog dial, or a touch panel laid on the display screen of the display unit 112, and is used for a user to input commands or data to the portable terminal 110.

The program control unit 111 of the portable terminal 110 is driven by power fed from a main power supply (not shown), such as a battery.

When a user of the portable terminal 110 with the IC card 100-4 installed therein passes the portable terminal 110 over a predetermined card reading and writing apparatus, wireless communication is initiated between the IC card 100 and the card reading and writing apparatus, so that data is exchanged between the digital control unit 103 and the card reading and writing apparatus via the antenna unit 101 and the analog unit 102, which serve as a wireless interface.

At this time, the carrier wave detector 106 detects a carrier wave from the card reading and writing apparatus to output a detection signal to the digital control unit 103.

In this embodiment, a specific address of the memory 104 locally connected to the digital control unit 103 is assigned to a status flag indicating the communication state of the IC card 100-4. The digital control unit 103 sets this status flag in response to detection of the carrier wave by the carrier wave detector 106, and resets the status flag when no carrier wave is detected.

A change in content of the status flag is sent to the program control unit 111 of the portable terminal 110 via the external interface 105.

The program control unit 111 detects the communication state of the IC card 100-4 with the card reading and writing apparatus based on the content of the status flag to perform processing according to the communication state. For example, the communication state is expressed on the display unit 112 by an icon indicating "communication in progress", a dialog for prompting user input is opened, an application corresponding to the communication state is enabled, telephone line connection is performed (in a case of cellular telephone), or access to a LAN or an external network such as the Internet is initiated. Furthermore, when the portable terminal 110 is connected to a telephone network or a network, data communicated between the IC card 100-4 and the card reading and writing apparatus can be transmitted to a host on the network, or, conversely, data downloaded from the host can be transmitted to the card reading and writing apparatus via the IC card 100-4.

Figure 9:
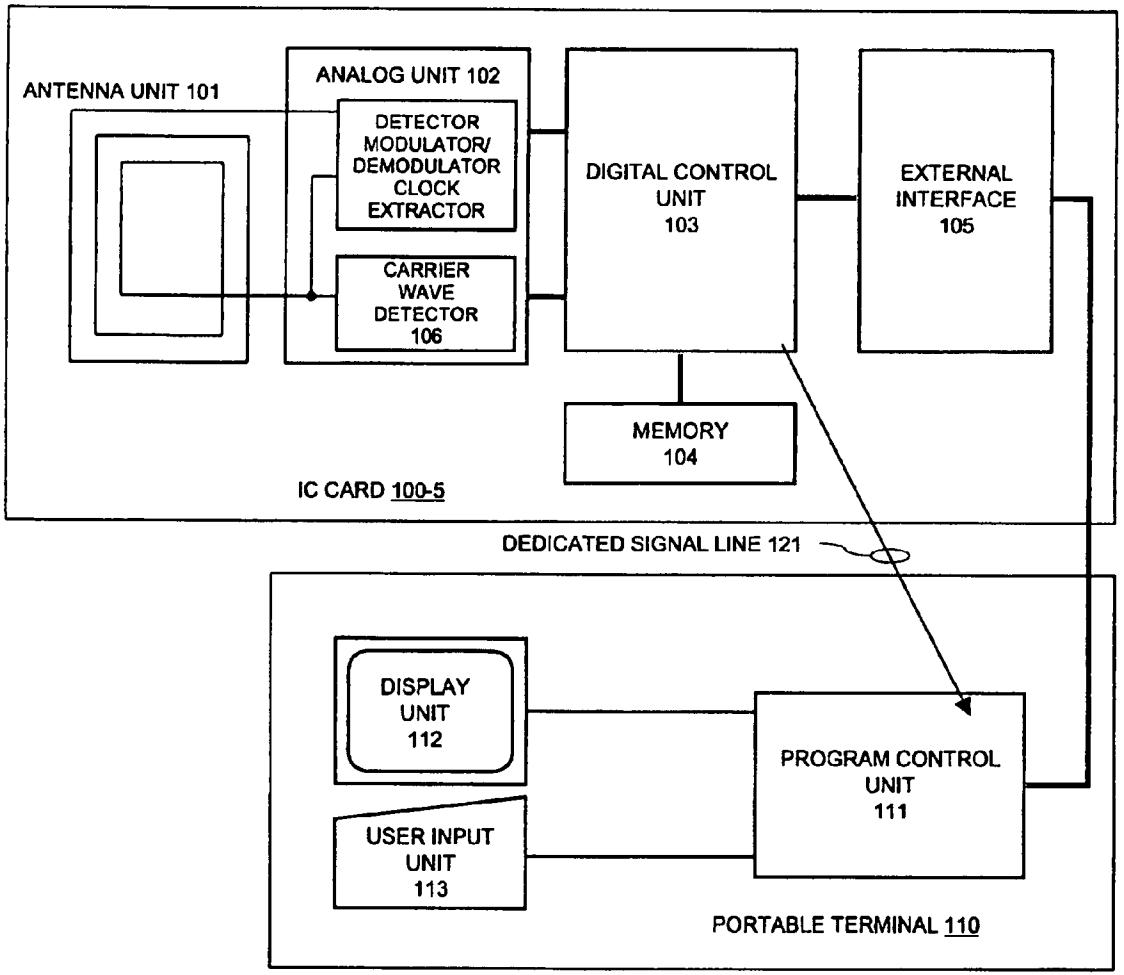
FIG. 9 is a schematic diagram of the hardware configuration of an IC card 100-5 according to a fifth embodiment of the present invention.

FIG. 9 schematically shows the hardware configuration of an IC card 100-5 according to a fifth embodiment of the present invention. As shown in FIG. 9, the IC card 100-5 includes an antenna unit 101, an analog unit 102, a digital control unit 103, a memory 104, an external interface 105, and a carrier wave detector 106.

The antenna unit 101 performs non-contact data transmission and reception to and from a card reading and writing apparatus (not shown). The analog unit 102 performs processing on an analog signal which is transmitted or received from the antenna unit 101, such as detection, modulation/demodulation, and clock extraction.

The carrier wave detector 106 detects a carrier wave from the card reading and writing apparatus to output a detection signal to the digital control unit 103.

The digital control unit 103 totally controls processing on received data or data to be transmitted or other operations of the IC card. The digital control unit 103 is locally connected with the addressable memory 104, which can be used to store electronic money or electronic ticketing applications, load a program code executed by the digital control unit 103, or to save the working data in progress.

The external interface 105 is a function module for connecting the digital control unit 103 to an external device, such as the portable terminal 110, according to an interface protocol different from that of a non-contact interface for connecting to the card reading and writing apparatus (not shown). The data written in the memory 104 can be transferred to the portable terminal 110 via the external interface 105.

In this embodiment, it is assumed that the IC card 100-5 is installed in the portable terminal 110 when used, and the external interface 105 is implemented as a wired interface such as a UART or $I^2C$ interface (described below). However, the interface specification of the external interface 105 is not limited in particular, and either a wired interface or a wireless interface such as a Bluetooth or IEEE.802.11b interface may be used.

In this embodiment, furthermore, the IC card 100-5 and the portable terminal 110 are connected with each other via the external interface 105 as well as a dedicated signal line 121. When a change in the communication state of the IC card 100-5 is detected by the carrier wave detector 106, the digital control unit 103 can report this detection directly to the portable terminal 110 via the dedicated signal line 121 without intermediate of the external interface 105.

The IC card 100-5 can be driven by, for example, a reception wave received from the card reading and writing apparatus via the antenna unit 101. It is to be understood that a part or all components of the IC card 100-5 may be driven by power supplied from the portable terminal 110.

The portable terminal 110 corresponds to, for example, an information processing terminal such as a cellular telephone, a PDA, or a personal computer (PC). The portable terminal 110 includes a program control unit 111, a display unit 112, and a user input unit 113.

The program control unit 111 includes, for example, a microprocessor, a RAM, and a ROM (these components are not shown in FIG. 9), and the microprocessor uses the RAM for a work area to execute various processing services according to a program code stored in the ROM. The processing services include the original functions of the portable terminal 110, such as a cellular telephone function, and processing for the IC card 100-2. It is to be understood that the program control unit 111 may include an external storage device such as a hard disk, and other peripheral devices.

The program control unit 111 can access the IC card 100-5 via the external interface 105.

In this embodiment, the program control unit 111 is connected directly to the IC card 100-2 via the dedicated signal line 121. The dedicated signal line 121 is used to report a change in the internal state of the IC card 100-5 to the program control unit 111.

The display unit 112 is formed of, for example, a liquid crystal display (LCD), and can present the processing result of the program control unit 111 on a screen for notifying the user.

The user input unit 113 is formed of a keyboard, a jog dial, or a touch panel laid on the display screen of the display unit 112, and is used for a user to input commands or data to the portable terminal 110.

The program control unit 111 of the portable terminal 110 is driven by power fed from a main power supply (not shown), such as a battery.

When a user of the portable terminal 110 with the IC card 100-5 installed therein passes the portable terminal 110 over a predetermined card reading and writing apparatus, wireless communication is initiated between the IC card 100-5 and the card reading and writing apparatus, so that data is exchanged between the digital control unit 103 and the card reading and writing apparatus via the antenna unit 101 and the analog unit 102, which serve as a wireless interface.

At this time, the carrier wave detector 106 detects a carrier wave from the card reading and writing apparatus to output a detection signal to the digital control unit 103.

In this embodiment, a specific address of the memory 104 locally connected to the digital control unit 103 is assigned to a status flag indicating the communication state of the IC card 100-4. The digital control unit 103 sets this status flag in response to detection of the carrier wave by the carrier wave detector 106, and resets the status flag when no carrier wave is detected.

The digital control unit 103 directly reports a change in content of the status flag to the program control unit 111 of the portable terminal 110 via the dedicated signal line 121.

The program control unit 111 detects the communication state of the IC card 100-5 with the card reading and writing apparatus based on the report via the dedicated signal line 121 to perform processing according to the communication state. For example, the communication state is expressed on the display unit 112 by an icon indicating "communication in progress", a dialog for prompting user input is opened, an application corresponding to the internal state is enabled, telephone line connection is performed (in a case of cellular telephone), or access to a LAN or an external network such as the Internet is initiated. Furthermore, when the portable terminal 110 is connected to a telephone network or a network, data communicated between the IC card 100-5 and the card reading and writing apparatus can be transmitted to a host on the network, or, conversely, data downloaded from the host can be transmitted to the card reading and writing apparatus via the IC card 100-5.

Figure 10:
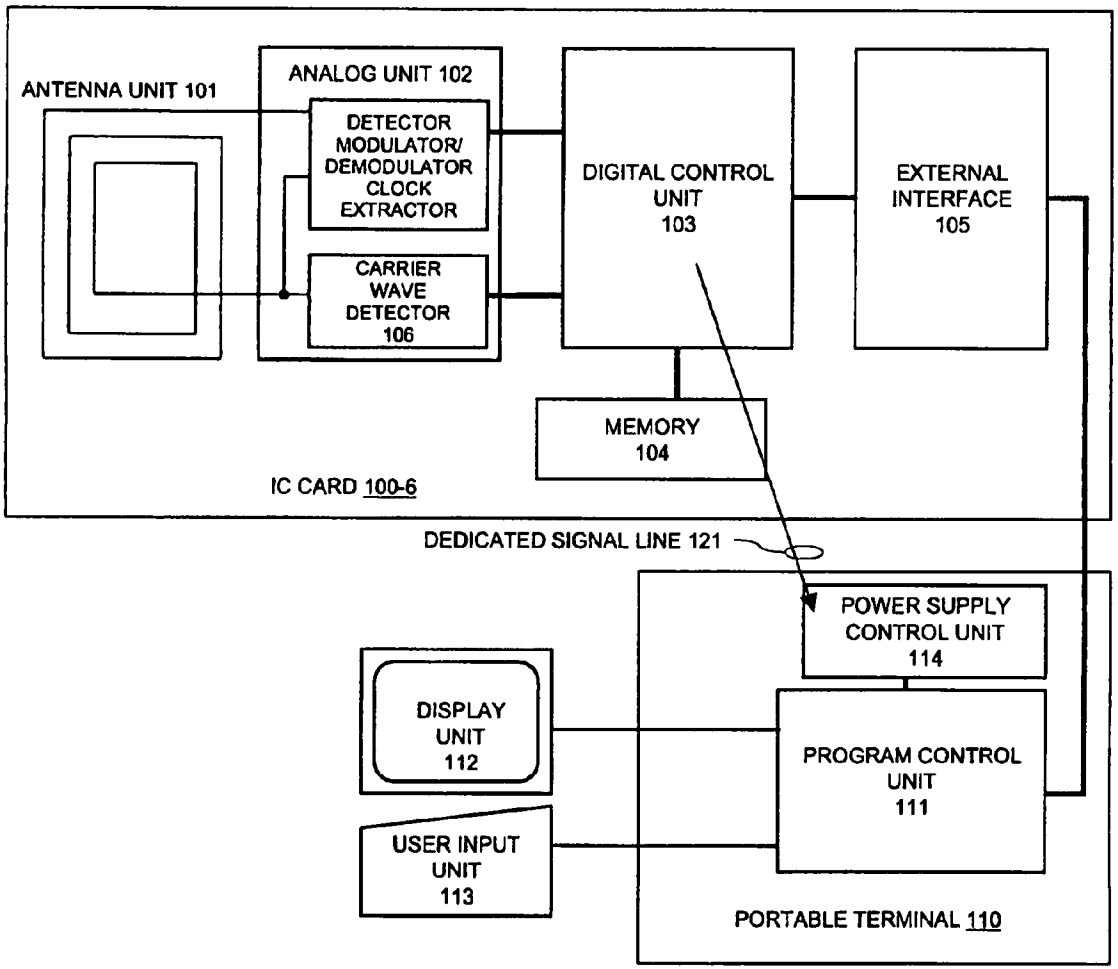
FIG. 10 is a schematic diagram of the hardware configuration of an IC card 100-6 according to a sixth embodiment of the present invention.

FIG. 10 schematically shows the hardware configuration of an IC card 100-6 according to a sixth embodiment of the present invention. As shown in FIG. 10, the IC card 100-6 includes an antenna unit 101, an analog unit 102, a digital control unit 103, a memory 104, an external interface 105, and a carrier wave detector 106.

The antenna unit 101 performs non-contact data transmission and reception to and from a card reading and writing apparatus (not shown). The analog unit 102 performs processing on an analog signal which is transmitted or received from the antenna unit 101, such as detection, modulation/demodulation, and clock extraction.

The carrier wave detector 106 detects a carrier wave from the card reading and writing apparatus to output a detection signal to the digital control unit 103.

The digital control unit 103 totally controls processing on received data or data to be transmitted or other operations of the IC card. The digital control unit 103 is locally connected with the addressable memory 104, which can be used to store of electronic money or electronic ticketing applications, load a program code executed by the digital control unit 103, or to save the working data in progress.

The external interface 105 is a function module for connecting the digital control unit 103 to an external device, such as the portable terminal 110, according to an interface protocol different from that of a non-contact interface for connecting to the card reading and writing apparatus (not shown). The data written in the memory 104 can be transferred to the portable terminal 110 via the external interface 105.

In this embodiment, it is assumed that the IC card 100-6 is installed in the portable terminal 110 when used, and the external interface 105 is implemented as a wired interface such as a UART or $I^2C$ interface (described below). However, the interface specification of the external interface 105 is not limited in particular, and either a wired interface or a wireless interface such as a Bluetooth or IEEE.802.11b interface may be used.

In this embodiment, furthermore, the IC card 100-3 and the portable terminal 110 are connected with each other via the external interface 105 as well as a dedicated signal line 121. When a change in the communication state of the IC card 100-6 is detected by the carrier wave detector 106, the digital control unit 103 can report this detection directly to the portable terminal 110 via the dedicated signal line 121 without intermediation of the external interface 105.

The IC card 100-6 can be driven by, for example, a reception wave received from the card reading and writing apparatus via the antenna unit 101. It is to be understood that a part or all components of the IC card 100-6 may be driven by power supplied from the portable terminal 110.

The portable terminal 110 corresponds to, for example, an information processing terminal such as a cellular telephone, a PDA, or a personal computer (PC). The portable terminal 110 includes a program control unit 111, a display unit 112, a user input unit 11, and a power supply control unit 114.

The program control unit 111 includes, for example, a microprocessor, a RAM, and a ROM (these components are not shown in FIG. 10), and the microprocessor uses the RAM for a work area to execute various processing services according to a program code stored in the ROM. The processing services include the original functions of the portable terminal 110, such as a cellular telephone function, and processing for the IC card 100-3. It is to be understood that the program control unit 111 may include an external storage device such as a hard disk, and other peripheral devices.

The program control unit 111 can access the IC card 100-6 via the external interface 105.

The display unit 112 is formed of, for example, a liquid crystal display (LCD), can present the processing result of the program control unit 111 on a screen for notifying the user.

The user input unit 113 is formed of a keyboard, a jog dial, or a touch panel laid on the display screen of the display unit 112, and is used for a user to input commands or data to the portable terminal 110.

The program control unit 111 of the portable terminal 110 is driven by power fed from a main power supply (not shown), such as a battery. The power supply control unit 114 can control power supply from the main power supply to the program control unit 111 to be turned on or off.

In this embodiment, the power supply control unit 114 is connected directly to the IC card 100-6 via the dedicated signal line 121. When the carrier wave detector 106 of the IC card 100-6 detects a change in the communication state of the IC card 100-6, this detection is reported to the power supply control unit 114 using the dedicated signal line 121, and the power supply control unit 114 can control power supply to the program control unit 111 to be turned on or off according to the communication state.

When a user of the portable terminal 110 with the IC card 100-6 installed therein passes the portable terminal 110 over a predetermined card reading and writing apparatus, wireless communication is initiated between the IC card 100-6 and the card reading and writing apparatus, so that data is exchanged between the digital unit 103 and the card reading and writing apparatus via the antenna unit 101 and the analog unit 102, which serve as a wireless interface.

At this time, the carrier wave detector 106 detects a carrier wave from the card reading and writing apparatus to output a detection signal to the digital control unit 103.

In this embodiment, a specific address of the memory 104 locally connected to the digital control unit 103 is assigned to a status flag indicating the communication state of the IC card 100-6. The digital control unit 103 sets this status flag in response to detection of the carrier wave by the carrier wave detector 106, and resets the status flag when no carrier wave is detected.

The digital control unit 103 directly reports the change in content of the status flag to the program control unit 111 of the portable terminal 110 via the dedicated signal line 121.

The power supply control unit 114 performs processing corresponding to the reported communication state. For example, when the IC card 100-3 is connected to the card reading and writing apparatus and the program control unit 111 must start processing for data transfer, power supply to the program control unit 111 is turned on to execute it. Conversely, when the IC card 100-3 and the card reading and writing apparatus are disconnected and the program control unit 111 need not be driven for the IC card 100-3, the power supply control unit 114 shuts off power supply to the program control unit 111 to deactivate it.

Figure 11:
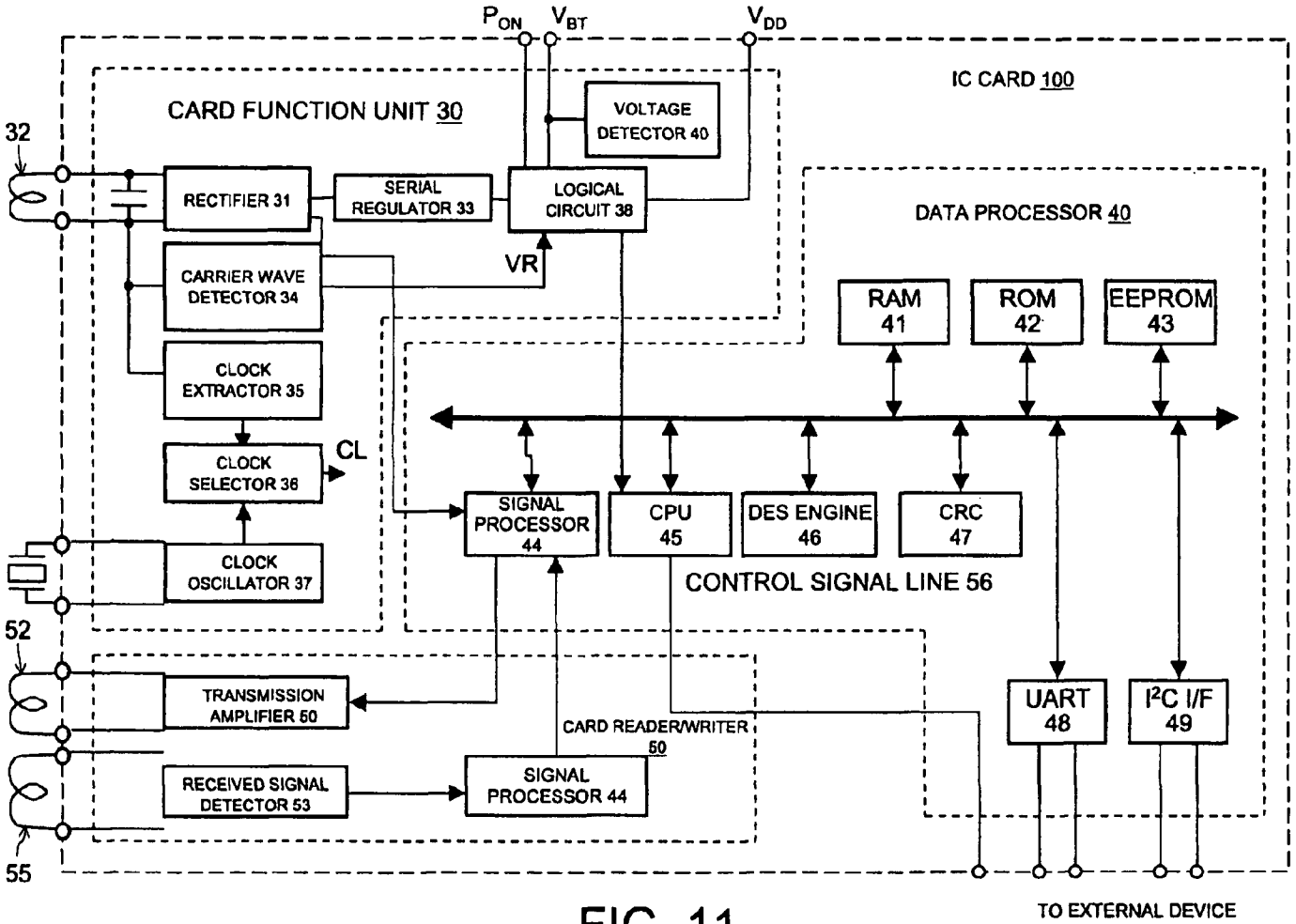
FIG. 11 is a diagram showing in further detail the hardware configuration of the IC card 100 which realizes the embodiments shown in FIGS. 5 through 10.

FIG. 11 is a diagram showing in further detail the hardware configuration of the IC card 100 which realizes the embodiments shown in FIGS. 5 through 10. In the example shown in FIG. 11, the IC card further has a card reading and writing function. The card reading and writing function of the IC card can achieve the payment system shown in FIG. 2. However, the card reading and writing function of the IC card is not essential to the present invention.

As shown in FIG. 11, the IC card 100 includes a card function unit 30 corresponding to the analog unit 102, a data processor 40 corresponding to the digital control unit 103, the memory 104, and the external interface 105, and a card reader/writer 50.

In the card function unit 30, a carrier wave received by an antenna 32 is rectified by a rectifier 31, and is then supplied to a signal processor 44 of the data processor 40 and to a logical circuit 38 via a serial regulator 33.

The logical circuit 38 controls a voltage from the serial regulator 33 so that a desired power voltage $V_{DD}$ for use in the IC card 100 is supplied.

The serial regulator 33 maintains an output voltage substantially constant, regardless of an input voltage. Specifically, the serial regulator 33 increases the internal impedance when the input voltage is high, and decreases the internal impedance when the input voltage is low, thus making it possible to maintain the voltage.

A voltage detector 39 monitors the output terminal voltage of an external power supply (such as a battery) connected to the logical circuit 38 to output a signal for prohibiting use of the external power supply to the logical circuit 38 when the voltage of the external power supply is below a predetermined voltage.

In the card function unit 30, an electric wave input from the antenna 32 is further checked by a carrier wave detector 34 to determine whether or not the received wave contains a carrier wave. If it contains, a carrier wave detection signal VR is output to the logical circuit 38. The logical circuit 38 can also output to the data processor 40 a signal indicating that a carrier wave has been detected.

A clock extractor 35 extracts clock from the electric wave input from the antenna 32, and supplies it to a clock selector 36. A clock oscillator 37, which is formed of, for example, a crystal oscillator external to the IC card 100, generates clock of a driving frequency for use in the IC card 100, and supplies it to the clock selector 36. The clock selector 36 selects one of the clock supplied from the clock extractor 35 and the clock supplied from the clock oscillator 37, and supplies the selected clock to the components of the IC card 100.

The card reader/writer 50 includes a transmission amplifier 51, a received signal detector 53, a reception amplifier/filter 54, and transmission and reception antennas 52 and 55.

For data transmission, a transmission signal, which has been subjected to modulation and D/A conversion by the signal processor 44 of the data processor 40 so as to be up-converted into an analog baseband signal, is sent from the antenna 51 via the transmission amplifier. A signal received from the antenna 52 is detected by the received signal detector 53, and is amplified by the reception amplifier 54 before being supplied to the signal processor 44. The signal processor 44 down-converts the signal into an analog baseband signal, which is then subjected to D/A conversion and demodulation, thereby reproducing digital data.

Figure 4:
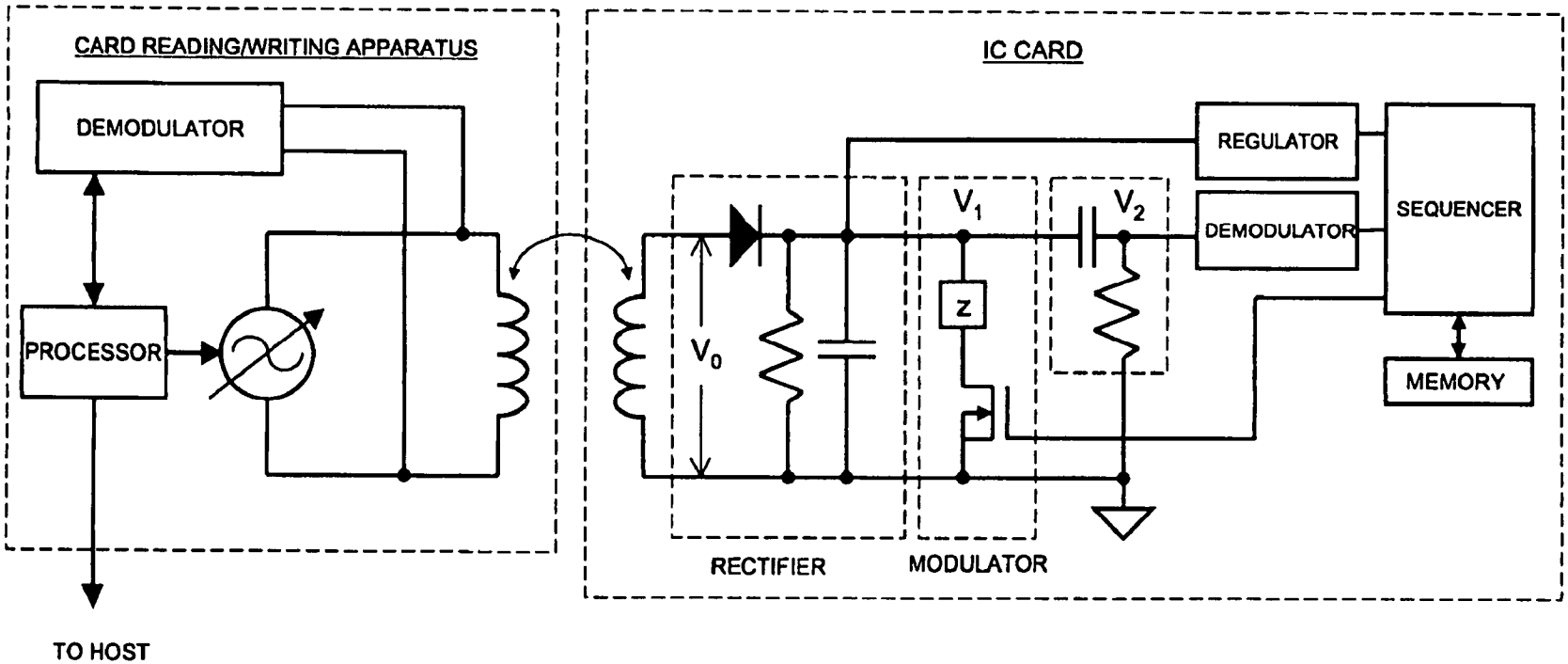
FIG. 4 is a model diagram of the combination of the card reading and writing apparatus and the IC card, which is considered as a single transformer.

The card reading and writing operation between the IC card and the card reading and writing apparatus has been previously described with reference to FIGS. 3 and 4.

The data processor 40 includes the above-noted signal processor 44, a CPU (Central Processing Unit) 45, a DES (Data Encryption Standard) engine 46, a CRC (Cyclic Redundancy Check) 47, a RAM (Random Access Memory) 41, a ROM (Read Only Memory) 42, an EEPROM (Electrically Erasable and Programmable ROM) 43, a UART interface 48, and an $I^2C$ interface 49. These components are connected with each other via an internal bus.

The CPU 45 serves as a main controller for controlling the overall operation of the IC card 100 to execute, for example, a program code stored in the ROM 42 (or the EEPROM 43) under the control of the operating system (OS). For example, the CPU 45 executes an application regarding data which is transmitted or received via the card function unit 30 or the card reader/writer 40.

The signal processor 44 performs processing on data to be transmitted via the card function unit 30 or the card reader/writer 40, including modulation, D/A conversion, and up-conversion, and also performs processing on received data, including down-conversion, A/D conversion, and demodulation.

The DES engine 46 encodes and decodes data, which is transmitted or received via the card function unit 30 or the card reader/writer 40, using open-source secret key encoding.

The CRC 47 performs cyclic redundancy checks on data received via the card function unit 30 or the card reader/writer 40.

The UART 48 and the $I^2C$ interface form external wired interfaces for connecting the IC card 100 to external devices (not shown in FIG. 11) such as a cellular telephone, a PDA, and a personal computer. The UART (Universal asynchronous receiver transmitter) 48 has functions of converting a parallel signal in a computer into a serial signal, and converting a serial signal into a parallel signal.

The RAM 41 is a rewritable memory device, and the CPU 41 uses the RAM 41 as a work area to execute a program. Since the memory space provided by the RAM 41 is addressable, the CPU 41 or the devices on the internal bus can access this memory space.

In this embodiment, the CPU 45 receives a report of carrier wave detection from the card function unit 30 (described above). The CPU 45 which processes data to be transmitted or received data via the signal processor 44 controls the internal state of the IC card 100 according to a communication phase.

A specific address of the memory space extended on the RAM 41 is assigned to an internal status flag indicating whether or not a carrier wave from the external card reading and writing apparatus has been detected (that is, the communication state) or indicating the internal state of the IC card 100. The CPU 45 updates setting details of the internal status flag according to a change in the communication state or the internal state.

An external device connected via an external wired interface, such as the UART 48 or the $I^2C$ interface 49, can also access the internal status flag on the RAM 41 to recognize the communication state or the internal state of the IC card 100. In this way, the external device detects the internal state of the IC card 100 to perform processing corresponding to the internal state. For example, the internal state is expressed on the display unit 112 by an icon indicating "communication in progress", a dialog for prompting user input is opened, an application corresponding to the internal state is enabled, telephone line connection is performed (in a case of cellular telephone), or access to a LAN or an external network such as the Internet is initiated. Furthermore, when the portable terminal 110 is connected to a telephone network or a network, data communicated between the IC card 100 and the card reading and writing apparatus can be transmitted to a host on the network, or, conversely, data downloaded from the host can be transmitted to the card reading and writing apparatus via the IC card 100.

The CPU 45 further includes a control signal line 56 output directly to an external device (not shown), and can therefore directly report a change in the communication state or the internal state to the external device via the control signal line 56 without intermediation of an external wired interface such as the UART 48 or the $I^2C$ interface 49. The external device receives the report of the internal state of the IC card 100 to perform processing corresponding to the internal state (see above).

Appendix

The present invention has been described in detail with reference to specific examples. However, it is obvious that modifications or replacements may be made to the embodiment by those skilled in the art without departing the spirit and scope of the present invention. The present invention has been disclosed in an exemplary form, and this form should not be construed as the restricted one. Reference should be made to the claims for delineation of the scope of the present invention.

INDUSTRIAL APPLICABILITY

According to the present invention, there can be provided a better non-contact IC card or IC chip including a wireless interface for wireless data access to a memory function from an external reader/writer and a wired interface for connection with an external device, and a better information processing terminal connected to such an IC card via a wired interface or incorporating such an IC chip when used.

According to the present invention, furthermore, there can be provided a better IC card including both a wireless interface and a wired interface, in which processing related to the IC card can be smoothly initiated without heavy burden on the user, and a better information processing terminal connected to such an IC card via a wired interface or having the IC card installed therein.

According to the present invention, furthermore, there can be provided a better IC card including both a wireless interface and a wired interface, in which processing according to the communication state between the IC card and a card reading and writing apparatus or the internal state of the IC card can be smoothly initiated, and a better information processing terminal connected to such an IC card via a wired interface or having the IC card installed therein.

When an IC card is passed over a card reading and writing apparatus, the IC card starts communication with the card reading and writing apparatus via a wireless interface. According to the present invention, a change in the internal state of the IC card can be reported to or a report indicating whether or not a carrier wave from the card reading and writing apparatus has been detected can be sent to an information processing terminal via an external wired interface or a dedicated control signal line. The information processing terminal does not rely on a user operation to automatically enable a specific application for processing the IC card or power on a controller to activate it. When no carrier wave is detected, the controller may be powered off or deactivated, thus achieving power saving.

The invention claimed is:

1. An IC chip configured for incorporation into a portable communication terminal apparatus, the IC chip comprising:

a memory for storing information;

a wireless communication unit for receiving an electromagnetic wave from an external reader/writer;

an analog signal processing unit for processing the received electromagnetic wave, said analog signal processing unit including a carrier wave detection unit for detecting a carrier wave from the electromagnetic wave received by the wireless communication unit to output a carrier wave detection signal;

an interface unit configured for connection to a program control unit residing outside the IC chip but within the portable communication terminal apparatus, the connection to the program control unit being through a wired interface when the IC chip is incorporated into the portable communication terminal apparatus; and a digital control unit for processing a signal outputted from the analog signal processing unit and controlling access to the memory according to an access request from the external reader/writer or an access request from the program control unit through the interface unit, wherein said digital control unit notifies said program control unit of the portable communication terminal apparatus of an internal state of the IC chip, which said internal state changes according to the wireless communication with the external reader/writer, by the carrier wave detection signal detected.

2. An IC chip according to claim 1, wherein the wireless communication unit varies a load across an antenna thereof according to a response signal to a query signal from the external reader/writer, so that a signal that appears in a receiving circuit of the external reader/writer is amplitude-modulated for communication.

3. An IC chip according to claim 1, wherein said notification of the internal state from said digital control unit, which is obtained from the carrier wave detection unit, is sent to the program control unit via the interface unit.

4. An IC chip according to claim 1, wherein said notification of the internal state from said digital control unit, which is obtained from the carrier wave detection unit, is sent to the program control unit via a dedicated communication path and not via the interface unit.

5. A portable communication terminal apparatus which is equipped with an IC chip for performing wireless communication with an external reader/writer, said portable communication terminal apparatus comprising:

a program control unit for controlling the overall operation of the terminal; and a power supply control unit for controlling power supply to the program control unit to be turned on or off, wherein said IC chip comprises;

a wireless communication unit for receiving an electromagnetic wave from said external reader/writer;

an analog signal processing unit for processing the received electromagnetic wave, said analog signal processing unit including a carrier wave detection unit for detecting a carrier wave from the electromagnetic wave received by the wireless communication unit to output a carrier wave detection signal;

an interface unit configured for connection to the program control unit, the program control unit residing outside the IC chip but within the portable communication terminal apparatus, the connection to the program control unit being through a wired interface;

a memory for storing information; and a digital control unit for processing a signal outputted from the analog signal processing unit and controlling access to the memory according to an access request from the external reader/writer or an access request from the program control unit through the interface unit, wherein said digital control unit notifies said program control unit of the portable communication terminal apparatus of an internal state of the IC chip, which said internal state changes according to the wireless communication with the external reader/writer, by the carrier wave detection signal detected.

6. A portable communication terminal apparatus according to claim 5, wherein the program control unit starts predetermined processing when the IC chip detects a carrier wave from the external reader/writer.

7. A portable communication terminal apparatus according to claim 5, wherein the power supply control unit switches power supply to the control unit to be turned on or off according to whether or not the IC chip has detected a carrier wave from the external reader/writer.

8. A portable communication terminal apparatus according to claim 5, wherein said notification of the internal state from said digital control unit to said program control unit, which is obtained from the carrier wave detection signal, is received from the IC chip via the interface unit.

9. A portable communication terminal apparatus according to claim 5, wherein said notification of the internal state from said digital control unit to said program control unit, which is obtained from the carrier wave detection signal, is received from the IC chip via a dedicated communication path and not via the interface unit.

10. A portable communication terminal apparatus according to claim 5, further comprising a display unit for visually displaying information, wherein the report indicating whether or not the carrier wave has been detected, which is received from the IC chip, is displayed on the display unit for output.

11. A portable communication terminal apparatus according to claim 5, further comprising a user input unit for inputting commands or data to the portable communication terminal apparatus.

*12. An IC chip configured for incorporation into a portable communication terminal apparatus, the IC chip comprising:*

*a memory configured to store information;*

*wireless communication circuitry configured to receive a signal from an external reader/writer;*

*interface circuitry configured to connect to program control circuitry residing outside the IC chip but within the portable communication terminal apparatus, the connection to the program control circuitry being through a wired interface when the IC chip is incorporated into the portable communication terminal apparatus; and*

*digital control circuitry configured to process the signal and control access to the memory according to an access request from the external reader/writer or an access request from the program control circuitry through the interface circuitry,*

*wherein said digital control circuitry is configured to notify said program control circuitry of the portable communication terminal apparatus of an internal state of the IC chip, said internal state changing according to a communication between the wireless communication circuitry and the external reader/writer.*

*13. An IC chip according to claim 12, wherein said notification of the internal state from said digital control circuitry is sent to the program control circuitry via the interface circuitry.*

*14. An IC chip according to claim 12, wherein said notification of the internal state from said digital control circuitry is sent to the program control circuitry via a dedicated communication path and not via the interface circuitry.*

*15. A portable communication terminal apparatus which is equipped with an IC chip for performing wireless communication with an external reader/writer, said portable communication terminal apparatus comprising:*

*program control circuitry for controlling the overall operation of the terminal; and*

*power supply control circuitry for controlling power supply to the program control circuitry to be turned on or off, wherein said IC chip comprises;*

*wireless communication circuitry configured to receive a signal from said external reader/writer;*

*interface circuitry configured to connect to the program control circuitry, the program control circuitry residing outside the IC chip but within the portable communication terminal apparatus, the connection to the program control circuitry being through a wired interface;*

*a memory configured to store information; and*

*digital control circuitry configured to process a signal and control access to the memory according to an access request from the external reader/writer or an access request from the program control circuitry through the interface circuitry,*

*wherein said digital control circuitry is configured to notify said program control circuitry of the portable communication terminal apparatus of an internal state of the IC chip, said internal state changing according to a communication between the wireless communication circuitry and with the external reader/writer.*

*16. A portable communication terminal apparatus according to claim 15, wherein the program control circuitry starts predetermined processing when the IC chip detects a carrier wave from the external reader/writer.*

*17. A portable communication terminal apparatus according to claim 15, wherein the power supply control circuitry switches power supply to the control circuitry to be turned on or off according to whether or not the IC chip has detected a carrier wave from the external reader/writer.*

*18. A portable communication terminal apparatus according to claim 15, wherein said notification of the internal state from said digital control circuitry to said program control circuitry is received from the IC chip via the interface circuitry.*

*19. A portable communication terminal apparatus according to claim 15, wherein said notification of the internal state from said digital control circuitry to said program control circuitry is received from the IC chip via a dedicated communication path and not via the interface circuitry.*

*20. A portable communication terminal apparatus according to claim 15, further comprising:*

*display circuitry for visually displaying information,*

*wherein the report indicating whether or not a carrier wave has been detected, which is received from the IC chip, is displayed on the display circuitry for output.*

*21. A portable communication terminal apparatus according to claim 15, further comprising:*

*user input circuitry for inputting commands or data to the portable communication terminal apparatus.*

* * * * *